(12) United States Patent
Ryou et al.

(10) Patent No.: US 11,411,271 B2
(45) Date of Patent: Aug. 9, 2022

(54) AIR-ZINC BATTERY MODULE

(71) Applicant: E.M.W. ENERGY CO., LTD., Seoul (KR)

(72) Inventors: Byoung Hoon Ryou, Seoul (KR); Jae Kyung Kong, Seoul (KR)

(73) Assignee: E.M.W. ENERGY CO., LTD., Seoul (KR)

( * ) Notice: Subject to any disclaimer, the term of this patent is extended or adjusted under 35 U.S.C. 154(b) by 657 days.

(21) Appl. No.: 15/772,603

(22) PCT Filed: Nov. 8, 2016

(86) PCT No.: PCT/KR2016/012783
§ 371 (c)(1),
(2) Date: May 1, 2018

(87) PCT Pub. No.: WO2017/086642
PCT Pub. Date: May 26, 2017

(65) Prior Publication Data
US 2019/0123408 A1    Apr. 25, 2019

(30) Foreign Application Priority Data
Nov. 16, 2015    (KR) .................. 10-2015-0160101

(51) Int. Cl.
*H01M 12/06*    (2006.01)
*H01M 12/02*    (2006.01)
(Continued)

(52) U.S. Cl.
CPC ......... *H01M 12/065* (2013.01); *H01M 12/02* (2013.01); *H01M 12/06* (2013.01);
(Continued)

(58) Field of Classification Search
CPC .... H01M 12/065; H01M 12/06; H01M 12/02; H01M 2/0275; H01M 2/10; H01M 2/1016; H01M 2250/20
(Continued)

(56) References Cited

U.S. PATENT DOCUMENTS 5,445,901 A * 8/1995 Korall ................ H01M 50/50
429/406
6,127,061 A * 10/2000 Shun ................... H01M 4/96
429/133

(Continued)

FOREIGN PATENT DOCUMENTS

CN    201414236 Y    2/2010
CN    102523643 A    6/2012
(Continued)

OTHER PUBLICATIONS

DE-19537683-02 English machine translation Kunz Eitel Dipl Ing (Year: 1998).*
International Search Report for PCT/KR2016/012783.

*Primary Examiner* — Eli S Mekhlin
(74) *Attorney, Agent, or Firm* — The PL Law Group, PLLC

(57) ABSTRACT

An air-zinc battery module includes a reception part having a sealed space formed therein, a gas storage part which is located in one area in the reception part and can discharge air or oxygen therefrom, and an air-zinc battery part which is located in another area in the reception part and includes at least one air-zinc battery cell for generating electricity when air or oxygen is supplied thereto.

12 Claims, 2 Drawing Sheets

(51) Int. Cl.
*H01M 50/20* (2021.01)
*H01M 50/116* (2021.01)

(52) U.S. Cl.
CPC ......... *H01M 50/116* (2021.01); *H01M 50/20* (2021.01); *Y02E 60/50* (2013.01); *Y02T 90/40* (2013.01)

(58) Field of Classification Search
USPC ...................................................... 429/72–89
See application file for complete search history.

(56) References Cited

U.S. PATENT DOCUMENTS

| | | | |
|---|---|---|---|
| 6,361,294 B1* | 3/2002 | Witzigreuter | H01M 6/50 417/413.3 |
| 2008/0102358 A1* | 5/2008 | Kowalczyk | H01M 2/0277 429/127 |
| 2009/0239132 A1 | 9/2009 | Johnson | |
| 2011/0143226 A1* | 6/2011 | Pulskamp | H01M 8/04201 429/405 |
| 2013/0224569 A1 | 8/2013 | Sakai et al. | |
| 2013/0344401 A1* | 12/2013 | Albertus | H01M 12/08 429/403 |

FOREIGN PATENT DOCUMENTS

| | | | | |
|---|---|---|---|---|
| CN | 202352802 U | | 7/2012 | |
| CN | 104377341 A | | 2/2015 | |
| DE | 19537683-02 | * | 4/1998 | ............. H01M 6/50 |
| JP | H07272769 A | | 10/1995 | |
| KR | 10-2000-0059195 A | | 10/2000 | |
| KR | 2001-0006346 A | | 1/2001 | |
| KR | 10-0839443 B1 | | 6/2008 | |
| KR | 10-0897367 B1 | | 5/2009 | |
| KR | 10-2012-0044722 A | | 5/2012 | |
| KR | 10-2012-0064939 A | | 6/2012 | |
| KR | 10-2012-0077943 A | | 7/2012 | |
| KR | 10-1189127 B1 | | 10/2012 | |
| KR | 10-1228434 B1 | | 2/2013 | |

* cited by examiner

AIR-ZINC BATTERY MODULE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/012783, filed Nov. 8, 2016, which claims priority to the benefit of Korean Patent Application No. 10-2015-0160101 filed in the Korean Intellectual Property Office on Nov. 16, 2015, the entire contents of which are incorporated herein by reference.

TECHNICAL FIELD

The present invention relates to an air-zinc battery module capable of being used in an underwater environment and having excellent long-term storage stability.

BACKGROUND ART

A battery has been conventionally and widely used as a means for supplying electric power to an electrical device. Conventionally, primary batteries such as a manganese dry cell, an alkaline manganese dry cell, a zinc-air battery, and the like, and secondary batteries such as a nickel-cadmium (Ni—Cd) battery, a nickel-hydrogen (Ni—H) battery, a lithium ion battery, and the like are used as batteries. Among the foregoing batteries, the zinc-air battery has advantages of providing a relatively high voltage of 1.4 V and having high energy density and large discharge capacity. Further, the zinc-air battery exhibits an almost constant discharge characteristic until discharge of the zinc-air battery is completed, and the zinc-air battery is considered as a battery capable of replacing a mercury battery of which usage is suppressed owing to containing a heavy metal.

Due to the above-described advantages, the air-zinc battery is particularly and actively applied to military weapons or equipment, but it is difficult for the air-zinc battery to be applied to military weapons (e.g., a torpedo and the like) and equipment which operate in an underwater environment since an air supply is blocked in the underwater environment.

Meanwhile, in order to resolve the above-described problem, application of a lithium ion battery which does not require air supply may be considered, but since the lithium ion battery is continuously discharged in an ordinary situation, there is a problem in that the lithium ion battery is excessively discharged to cause malfunction of weapons or equipment at a time when electricity generation is actually required.

SUMMARY

The present invention is directed to providing an air-zinc battery module capable of being used in an underwater environment in which an air supply is blocked and having excellent long-term storage stability.

One aspect of the present invention provides an air-zinc battery module including a reception part forming a sealed space therein, a gas storage part disposed inside or outside the reception part and configured to be capable of injecting air or oxygen into the reception part, and an air-zinc battery part including one or more air-zinc battery cells disposed at one region inside the reception part and configured to generate electricity when air or oxygen is supplied.

The reception part may be in the form of a hard case.

The reception part may be in the form of a flexible pack.

The gas storage part may be maintained in a closed state and may discharge air or oxygen in response to a user's opening signal or opening action.

The gas storage part may be maintained in the closed state and may be opened in response to an electric signal or physical pressure, which is transmitted from the outside, to discharge air or oxygen.

According to an air-zinc battery module of the present invention, an inflow of moisture can be blocked by a reception part forming a sealed space even when the air-zinc battery module is used in water, and air or oxygen can be supplied by a gas storage part provided in the reception part when necessary, such that, unlike an existing air-zinc battery, there is an advantage in that the air-zinc battery module of the present invention can be used in an underwater environment in which an air supply is blocked.

Further, the air-zinc battery module of the present invention has an excellent long-term storage property since discharge hardly occurs due to blocking of an inflow of outside air in an ordinary situation.

DETAILED DESCRIPTION

Figure 1:
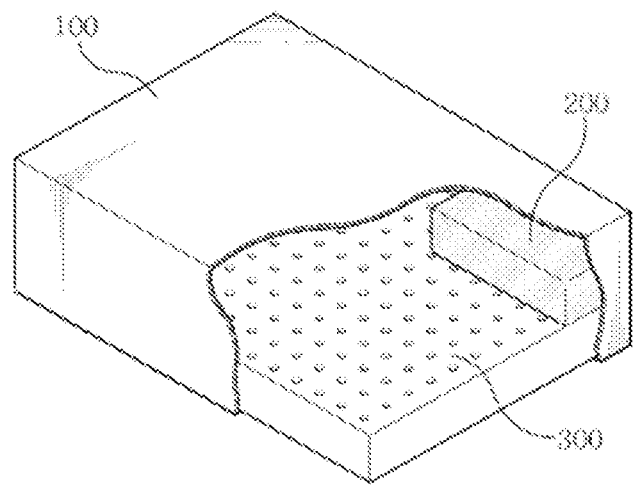
FIG. 1 is a diagram illustrating a structure of an air-zinc battery module according to one embodiment of the present invention.

The present invention may be modified into various forms and may have a variety of embodiments, and, therefore, specific embodiments will be illustrated in the drawings and described. The embodiments, however, are not to be taken in a sense which limits the present invention to the specific embodiments, and should be construed to include modifications, equivalents, or substitutions within the spirit and technical scope of the present invention. Also, in the following description of the present invention, when a detailed description of a known related art is determined to obscure the gist of the present invention, the detailed description thereof will be omitted.

The terms used herein are employed to describe only specific embodiments and are not intended to limit the present invention. Unless the context clearly dictates otherwise, the singular form includes the plural form. It should be understood that the terms "comprise," "include," and "have" specify the presence of stated herein features, numbers, steps, operations, components, parts, or combinations thereof, but do not preclude the presence or possibility of adding one or more other features, numbers, steps, operations, components, parts, or combinations thereof.

Although the terms "first," "second," and the like may be used herein to describe various components, these components should not be limited by these terms. The terms are used only for the purpose of distinguishing one component from another component.

The present invention relates to an air-zinc battery module, and more particularly, the air-zinc battery module includes a reception part forming a sealed space therein, a gas storage part disposed inside or outside the reception part and configured to be capable of injecting air or oxygen into the reception part, and an air-zinc battery part including one or more air-zinc battery cells disposed at one region inside the reception part and configured to generate electricity when air or oxygen is supplied.

In the present invention, the reception part may be in any form as long as it forms a sealed space therein, and, for example, the reception part may be in the form of a hard case, a flexible pack, or the like. When the reception part is in the form of a hard case, the reception part may be made of various materials such as a metal, a polymer resin, or the like, and the reception part may protect the gas storage part and the air-zinc battery part, which are disposed inside the reception part, from an external impact to some extent, such that there is an advantage in that storage stability of the hard case for the air-zinc battery module is excellent. On the other hand, when the reception part is in the form of a flexible pack, the reception part may be made of various flexible materials such as rubber or the like, and although storage stability of the flexible pack for the air-zinc battery module may be lower than that of the hard case for the air-zinc battery module, an exterior of the flexible pack is easily deformed such that the air-zinc battery module may be easily installed at a desired place and thus there is an advantage in that space utilization is high.

In the air-zinc battery module according to the present invention, since the reception part forms the sealed space therein, moisture may be prevented from flowing into the air-zinc battery module even when the air-zinc battery module falls into water.

In the present invention, the gas storage part, which is disposed inside or outside the reception part and is capable of injecting air or oxygen into the reception part, stores a certain amount of air or oxygen inside the gas storage part, and a shape of the gas storage part is not particularly limited and, for example, the gas storage part may be configured in the form of various shapes, such as a hard case, a flexible tube, or the like, to store air or oxygen therein.

The gas storage part is preferably configured with a structure in which the gas storage part is usually kept closed and, when electric power generation of the air-zinc battery module of the present invention is required, the gas storage part is opened to discharge air or oxygen according to a user's arbitrary opening signal or opening action, or according to an electrical signal or physical pressure which is applied from the outside. For example, when a user is in an emergency situation requiring electricity to press a tube-shaped gas storage part provided in the air-zinc battery module of the present invention with a certain pressure, a vulnerable portion of the gas storage part may be broken, and thus air or oxygen existing in the gas storage part is discharged into the sealed space in the reception part, and the discharged air or oxygen may be supplied to the air-zinc battery part in the air-zinc battery module to generate electricity.

In the present invention, the air-zinc battery part disposed at one region of the reception part is not discharged due to blocking of air or oxygen supply inside the sealed reception part in an ordinary situation, and when air or oxygen is discharged from the gas storage part, the air or oxygen may be supplied to the air-zinc battery part to generate electricity.

The air-zinc battery part includes one or more air-zinc battery cells, each of which is a basic battery unit. An appropriate number of air-zinc battery cells may be installed according to an application field of the air-zinc battery module of the present invention, and in some cases, a plurality of air-zinc battery cells are stacked to form a single battery unit and one or more battery units may be installed.

Each of the one or more air-zinc battery cells is configured with a structure including an air electrode part including an air diffusion layer and a catalytic active layer, a negative electrode part including a zinc (Zn) gel in which Zn and an electrolyte are mixed, and a separator disposed between the air electrode part and the negative electrode part and configured to prevent a short circuit therebetween.

In the present invention, the air-zinc battery cell may be in any form, but when a cell unit is formed in a stacked structure in consideration of space efficiency, it may be structurally preferable to use a plate-shaped air-zinc battery cell, and in this case, a protruding spacer is formed at a surface of the air electrode part of the air-zinc battery cell, and when a plurality of air-zinc battery cells are stacked to form a battery unit, a spacing is formed between the stacked air-zinc battery cells to allow air to smoothly pass through the spacing, such that an air supply may be smoothly performed to the stacked air-zinc battery cells constituting the battery unit and also a flow of air may be smoothly performed inside a case of the air-zinc battery module of the present invention.

The battery unit has a structure in which a plurality of air-zinc battery cells are electrically connected in series or in parallel and are stacked, and in the present invention, the plurality of air-zinc battery cells are connected in series or in parallel to form a single battery unit, such that it is advantageous to increase a voltage so as for the air-zinc battery cells to be applicable to electric appliances for various purposes such as home use, industrial use, and military use.

In the present invention, the number of air-zinc battery cells constituting the unit cell unit is not particularly limited, and the number of air-zinc battery cells per unit cell unit may be arbitrarily determined according to application in which the battery module of the present invention is used.

Even when used in water, the air-zinc battery module of the present invention is capable of blocking an inflow of moisture by the reception part forming the sealed space, and air or oxygen may be supplied by the gas storage part capable of injecting air or oxygen into the reception part when necessary, such that, unlike an existing air-zinc battery, there is an advantage in that the air-zinc battery module of the present invention can be used in an underwater environment in which an air supply is blocked and thus can be applied to military weapons, such as a torpedo and the like, and underwater equipment.

Further, the air-zinc battery module of the present invention has an excellent long-term storage property since discharge hardly occurs due to blocking of an inflow of outside air in an ordinary situation, and when electric energy is required, air or oxygen may be supplied by an arbitrary opening of the gas storage part to generate electricity, and, therefore, the air-zinc battery module of the present invention may be particularly suitable for a field such as military weapons including torpedoes or missiles, which are not needed in an ordinary situation but need to be operated without malfunction limitedly in a special situation such as a war.

A description for helping understanding of the present invention will be made below with reference to the accompanying drawings. The accompanying drawings are merely examples for helping understanding of the present invention, and thus the scope of the present invention is not limited thereto.

FIG. 1 is a diagram illustrating a structure of an air-zinc battery module according to one embodiment of the present invention. Referring to FIG. 1, an air-zinc battery module according to one embodiment of the present invention includes a case-shaped reception part 100 configured to be blocked from the outside to provide a sealed space therein and made of a flexible material, an air-zinc battery part 300 provided at an inner lower end portion of the case-shaped reception part 100 and configured with a single air-zinc battery cell in which a plurality of air holes are formed, and a gas storage part 200 configured to be capable of injecting air or oxygen into one region inside the reception part 100.

The gas storage part 200 is closed in an ordinary situation and thus discharge does not occur, and when a user presses to burst the gas storage part 200 at a time when electric energy is required, air or oxygen may be discharged from the gas storage part 200 and be supplied to the air-zinc battery part 300 to generate electricity.

Figure 2:
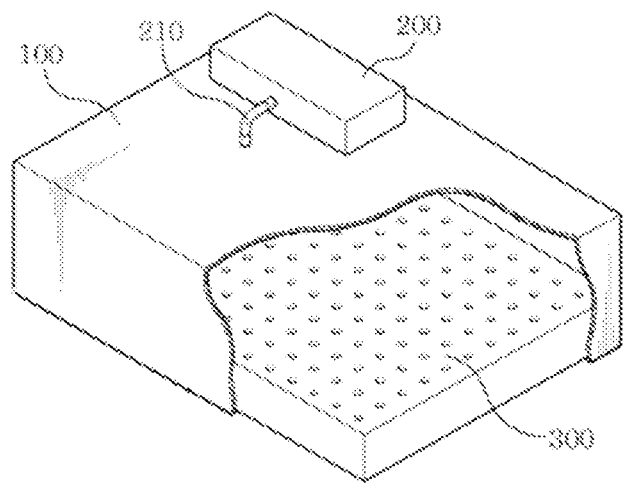
FIG. 2 is a diagram illustrating a structure of an air-zinc battery module according to another embodiment of the present invention.

FIG. 2 is a diagram illustrating a structure of an air-zinc battery module according to another embodiment of the present invention, and the air-zinc battery module according to another embodiment of the present invention shown in FIG. 2 includes a case-shaped reception part 100 configured to be blocked from the outside to provide a sealed space therein and made of a flexible material, and an air-zinc battery part 300 provided at an inner lower end portion of the case-shaped reception part 100 and configured with a single air-zinc battery cell in which a plurality of air holes are formed. A gas storage part 200 configured to be capable of injecting air or oxygen is coupled to an outer surface of the reception part 100, and the gas storage part 200 and the reception part 100 communicate with each other by a gas injection tube 210 which a path through which air or oxygen is injected.

Figure 3:
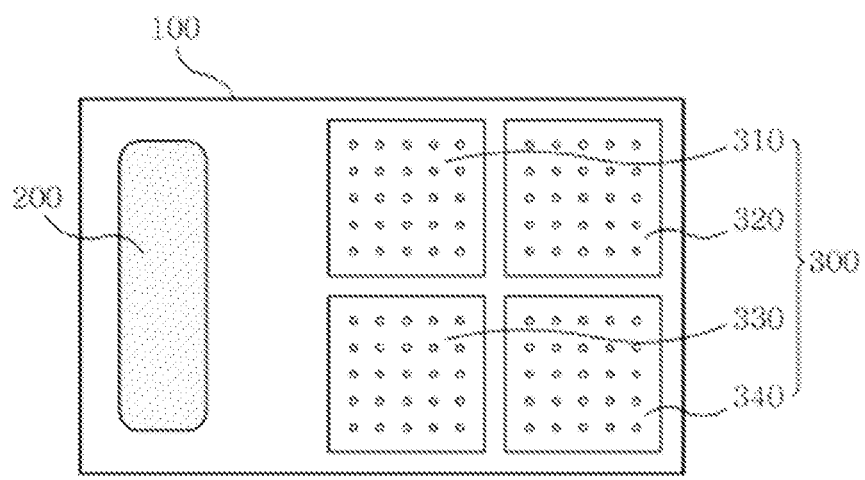
FIG. 3 is a conceptual diagram of an air-zinc battery module according to still another embodiment of the present invention.

FIG. 3 is a conceptual diagram of an air-zinc battery module according to still another embodiment of the present invention, and, referring to FIG. 2, a gas storage part 200 is provided at one region inside a reception part 100 which provides a sealed space, and an air-zinc battery part 300 configured with four air-zinc battery cells 310, 320, 330 and 340 is disposed at another region inside the reception part 100.

As described above, those skilled in the art can understand that the present invention may be implemented in other specific forms without departing from the technical spirit or the necessary features of the present disclosure. The scope of the present invention is defined by the appended claims rather than the detailed description, and it should be construed that all alterations or modifications derived from the meaning and scope of the appended claims and the equivalents thereof fall within the scope of the present invention.

The invention claimed is:

1. An air-zinc battery module comprising:
   a sealed case;
   a gas storage part disposed inside the case and configured to be capable of supplying air or oxygen into the case; and
   an air-zinc battery part disposed within the sealed case, the air-zinc battery part having a plurality of air holes exposed to an internal space of the sealed case to directly communicate with the sealed case so that the air-zinc battery part is configured to generate electricity when the air or the oxygen is supplied to the internal space of the sealed case,
   wherein the gas storage part and the air-zinc battery part are isolated from each other without a passageway therebetween.

2. The air-zinc battery module of claim 1, wherein the sealed case is in a form of a hard case.

3. The air-zinc battery module of claim 1, wherein the sealed case is in a form of a flexible pack.

4. The air-zinc battery module of claim 1, wherein the gas storage part is maintained in a closed state and discharges the air or the oxygen into the internal space of the sealed case in response to a user's opening signal or opening action.

5. The air-zinc battery module of claim 1, wherein the gas storage part is maintained in a closed state and is opened in response to an electric signal or physical pressure, which is transmitted from the outside, to discharge the air or the oxygen.

6. The air-zinc battery module of claim 1, wherein the gas storage part is disposed inside the sealed case.

7. The air-zinc battery module of claim 1, wherein the gas storage part is opened in response to an electric signal.

8. The air-zinc battery module of claim 1, wherein the gas storage part is opened in response to a physical pressure.

9. The air-zinc battery module of claim 1, wherein the gas storage part is capable of bursting in response to an external signal to supply the air or the oxygen to the air-zinc battery part so that electricity is generated.

10. The air-zinc battery module of claim 1, wherein the gas storage part is capable of bursting in response to an external pressure to supply the air or the oxygen to the air-zinc battery part so that electricity is generated.

11. An air-zinc battery module comprising:
    a sealed case;
    a gas storage part disposed inside the sealed case and configured to be capable of bursting to supply air or oxygen into the case in response to an external signal or pressure; and
    an air-zinc battery part disposed within the sealed case, the air-zinc battery part having a plurality of air holes exposed to an internal space of the sealed case so that the air-zinc battery part generates electricity only when the gas storage part bursts,
    wherein the gas storage part and the air-zinc battery part are isolated from each other without a passageway therebetween.

12. The air-zinc battery module of claim 11, wherein the gas storage part is formed of material capable of bursting in response to an external pressure.

* * * * *